Oct. 8, 1968         L. A. BETTCHER         3,404,802
CONTAINER FOR MATERIAL BEING FROZEN
Filed July 13, 1966

INVENTOR
LOUIS A. BETTCHER
BY
*Hoffmann and Yount*
ATTORNEYS

United States Patent Office 3,404,802
Patented Oct. 8, 1968

3,404,802
CONTAINER FOR MATERIAL BEING FROZEN
Louis A. Bettcher, Amherst, Ohio, assignor to Lab-O-Matic Corp., Vermilion, Ohio, a corporation of Ohio
Filed July 13, 1966, Ser. No. 564,974
9 Claims. (Cl. 220—85)

ABSTRACT OF THE DISCLOSURE

A tubular container for expansible material, such as comestible material to be frozen. The container includes an end closure that facilitates expansion of the material during freezing to minimize distortion of the tubular container during use.

---

The present invention relates to containers, and more particularly to a container for material being frozen, especially edible material such as meat products.

In present day practice edible material, such as meat products, for example hamburger, boneless beef, liver, sausage, etc., are often packed in metallic tubular containers, usually made of stainless steel or aluminum, and then frozen while in the container. The container of frozen material can then be stored and/or shipped until usage thereof is desired, at which time the material is removed from the container in its frozen state or after it is thawed.

The use of such metallic containers, however, has not been entirely satisfactory due to the fact that the products expanded upon being frozen which often causes a radial non-uniform bulging of the metallic containers. This bulging of the metallic containers, which is usually most pronounced midway between the ends of the container and which becomes permanent, makes removal of the product while in its frozen state difficult and repeated expansion of the containers on re-use results in the containers becoming permanently so distorted that they are unusable.

Accordingly, it is an object of the present invention to provide a new and improved container for expansible material, such as edible material which expands upon being frozen, and which is of a simple and economical construction, can be readily maintained in a sanitary condition, which is so constructed and arranged that material frozen therein can be readily removed therefrom while in its frozen state and which can be repeatedly re-used without becoming permanently distorted.

Another object of the present invention is to provide a new and improved container of the character described and in which the container is made of an elastic plastic material whereby the container returns to its normal shape even though it is distorted due to expansion of the material therein.

Yet another object of the present invention is to provide a new and improved container for material being frozen, especially meat products, which comprises a tubular member having end closures for closing the opposite ends thereof and in which one of the end closures is removable to permit the material to be placed within and removed from the container and in which at least one of the end closures includes a compressible or yieldable means which is compressible to take up the expansion of the material upon being frozen so that the tubular member retains its over-all normal shape.

A still further object of the present invention is to provide a new and improved container, as defined in the next preceding object, and in which both of the end closures are slidably received within the tubular member and are removable so that the entire container can be readily maintained in a sanitary condition and in which the end closures are so constructed and arranged that they can be readily inserted to close the opposite ends and readily removed to permit the material to be removed from the container.

The present invention resides in certain novel constructions and arrangement of parts, and further objects and advantages will appear from the following detailed description of the preferred embodiment described with reference to the accompanying drawings, which form a part of this specification and in which like reference characters designate corresponding parts throughout the several views and wherein.

Figure 1:
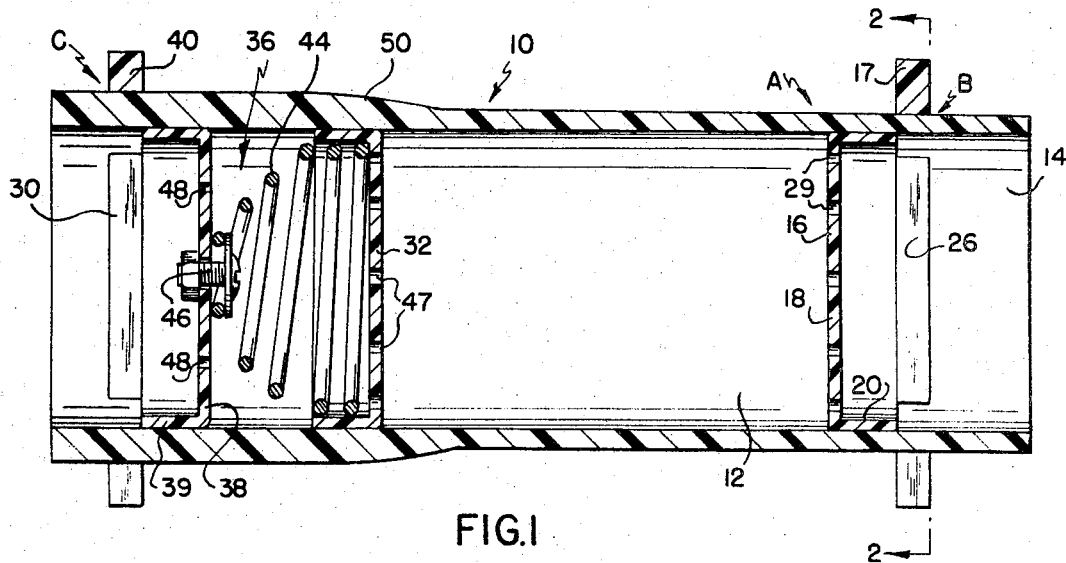
FIG. 1 is an axial cross sectional view of a container embodying the present invention.
Figures 2, 3:
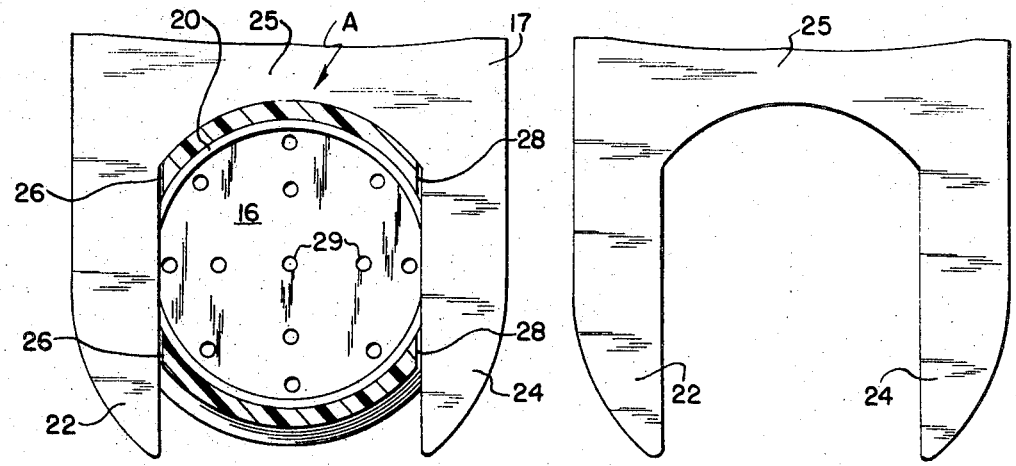
FIG. 2 is a sectional view taken approximately along line 2—2 of FIG. 1.
FIG. 3 is a plan view of one of the retainer elements.

Although the container of the present invention is useful for containing various kinds of expansible materials, it is particularly useful for containing edible material being frozen, especially meat products, such as, hamburger, boneless beef, liver, sausage, etc. For the purposes of this disclosure, the product will be hereinafter referred to as hamburger.

As representing one embodiment of the present invention, the drawings show a container 10 for hamburger. The container 10 comprises, in general, a tubular body member A and first and second end closures B and C for respectively closing the opposite ends of the tubular member A. Both of the end closures B and C, in the preferred embodiment, are removably secured within the tubular member A. The tubular member A and the end closures B and C define a closed chamber 12 in which the hamburger is received.

The tubular body member A can be of any suitable cross sectional shape, and is here shown as being a hollow cylinder. The tubular member A is made from a plastic material which will not contaminate the hamburger, preferably, an elastic or "memory" plastic material, such as polyethylene.

The first end closure B for closing one end 14 of the tubular member A comprises a cup-shaped member 16 slidably received within the end 14 of the tubular member A and a retainer element 17 against which the cup-shaped member 16 is adapted to abut to prevent outward displacement of the cup-shaped member 16. The cup-shaped member 16 has a bottom wall 18 which extends transversely or radially of the tubular member A and an annular axially extending flange or side wall 20 extending rearwardly of the bottom wall 18.

The retainer element 17 for retaining the cup-shaped member 16 within the end 14 of the tubular member A is a plate-like generally U-shaped or channel-like member having a pair of laterally spaced legs 22 and 24 connected to form a base 25. The members 22 and 24 are slidably received within a pair of diametrically opposed circumferentialy extending slots 26 and 28 in the tubular member A. The lateral spacing between the legs 22 and 24 of the U-shaped member 17 is less than the diameter of the tubular member A so that when the U-shaped member has its legs 22 and 24 received within the slots 26 and 28, portions of the legs 22 and 24 will project or extend radially inwardly of the inner side wall of the tubular member A. The radially inwardly projecting portions of the legs 22 and 24 form an abutment against which the rearward end of the annular side wall 20 of the cup-shaped member 16 abuts.

When the end closure B is positioned within the end 14 of the tubular member A and the end closure C is removed from the tubular member A, the hamburger can be placed or packed within the tubular member A. The hamburger can be placed or packed within the tubular member A either manually or by any suitable or conventional machine or apparatus used for this purpose. The hamburger when packed within the tubular member A will be forced against the bottom wall 18 of the cup-shaped member 16 with the latter being moved into abutting engagement with the retainer member 17. The bottom wall 18 of the cup-shaped member 16 is preferably provided with a plurality of small openings 29 to allow the air within the tubular member A to escape or be forced out of the tubular member A as the hamburger is being packed therein.

After the hamburger has been packed within the tubular member A, the second end closure C is secured within the other end 30 of the tubular member A. The end closure C comprises a cup-shaped closure element 32 slidably received within the tubular member A and which is of an identical construction to the cup-shaped closure element 16 of the end closure B, and a retainer means 36 for retaining the closure element 32 within the end 30 of the tubular member A. The retainer means 36, in the illustrated embodiment, comprises a cup-shaped element 38 having an annular side wall 39 slidably received within the end 30 of the tubular member A and a retainer member 40 of the same construction as the retainer member 17 for the closure means B. The retainer element 40 is carried by the tubular member A and functions to retain the element 38 within the end 30 of the tubular member A in the same manner that the retainer element 17 is carried by the tubular member A and functions to retain the closure element 16 within the end 14 of the tubular member A.

In accordance with one of the provisions of the present invention, a compressible or yieldable means, here shown as being a compression spring 44, is provided to allow the hamburger contained within the chamber 12 to expand longitudinally or axially of the tubular member A upon being frozen. The compression spring 44 has one end fixed or secured to the retainer element 38 as by a bolt 46 and the other end in abutting engagement with the slidable closure element 32. The biasing force of the spring 44 positions or biases the closure element 32 against the hamburger within the chamber 12 so as to maintain the same in the shape of a packed cylindrical roll prior to being frozen. The closure element 32 and the member 38 preferably have a plurality of small openings 47 and 48 therethrough to enable air to escape from the chamber 12 as the closure element 32 is being positioned against the hamburger. The spring 44 also allows different amounts or portions of hamburger to be placed in the container at various times. In other words, it is not necessary to place the same amount of hamburger in the container each time that it is used.

The hamburger upon being frozen expands with at least a major portion of the expansion being taken up by the compression spring 44 which compresses to enable the closure element 32 to move toward the retainer element 38 so as to provide a volumetric enlargement of the chamber 12. By employing an end closure construction which includes a compressible means, the hamburger upon being frozen expands mainly in a direction axially of the tubular member A, although some radial expansion of the tubular member A may also take place during the freezing operation. This construction enables the tubular member A to essentially retain its cylindrical shape during the freezing operation which in turn enables the hamburger roll to be readily and more easily removed while in a frozen state from the container 10, since the roll will have the same or substantially the same diameter throughout its length. The hamburger after being frozen within the container 10 can be stored and/or shipped while in the container and thereafter can be allowed to thaw or removed in its frozen state by removing one or both of the end closures.

The tubular member A, in the preferred embodiment, at its end 30 has a radial thickness which is substantially greater than the radial thickness of the remaining portion of the tubular member A so as to provide a strengthened end 30 which can readily absorb the reaction forces imposed by the compression spring 44 without distorting the shape of the tubular member A. Preferably, the transition in radial wall thickness from the end 30 toward the end 14 is gradual, as indicated by reference number 50, so that when the tubular member A is subjected to freezing temperatures no abrupt variation in temperature from one end of the tube toward the other is experienced due to different wall thicknesses. The right hand end of the member A may have its wall thickness increased in a similar manner to that of the left hand end, if diesired.

The retainer elements 17 and 40 are snugly received within their respective circumferentially extending slots in the tubular member A and the biasing force of the spring 44 is such that they are held in tight engagement with the tubular member A so as to prevent accidental removal thereof during storage, shipment or normal handling of the container 10. To better assure the proper retention of the U-shaped members 17 and 40 in the member A, the members 17 and 40, and the slots in which they are received, may be tapered, increasing in thickness from top to bottom, as viewed in the drawings. The upper side of the base member 25 is preferably flat or slightly concave so that the container can be inverted from the position shown in the drawings and placed upon a shelf, counter or like flat surface. The downwardly projecting legs of the members 17 and 40, as viewed in the drawings, project a substantial distance below the lower side of the tubular member A, as viewed in the drawings, so that they can be bumped against a hard surface such as a counter top to help dislodge them from the tubular member A. All of the parts of the end closures B and C, except for the spring 44 and bolt 46, are preferably made of a plastic material which will not contaminate the hamburger, such as polyethylene.

The provision of removable end closures B and C at both ends of the tubular member A enables the container 10 to be readily disassembled and the parts thereof washed and cleaned so that the entire container can be readily maintained in a sanitary condition. By making the various parts of the container which come into contact with the hamburger from a plastic material like polyethylene, insures that the hamburger will not pick up any odors therefrom, as usually occurs if the contacting parts were made of metal. Moreover, since the tubular member A is made of an elastic plastic material, any radial distortion of its cylindrical shape due to expansion of the hamburger during the freezing operation will not be permanent, since such plastic will return to its normal shape upon removal of the hamburger.

Although the container, in the preferred embodiment, has a removable end closure for each end thereof, it will be, of course understood that the container could be provided with only one removable end closure with the other end closure being permanent, if desired.

From the foregoing description of the illustrated embodiment of the present invention, it will be apparent that the objects heretofore enumerated and others have been accomplished and that a new and improved container for expansible material, especially material such as meat products or the like, which expand upon being frozen has been provided.

Although the container of the present invention has been illustrated and described therein to a somewhat detailed extent, it will be understood, of course, that the invention is not to be regarded as being limited correspondingly in scope, but includes all changes and modifications coming within a term of the claims hereof.

Having described my invention, I claim:

1. A container for expansible material comprising, a tubular member, first and second end closures for closing the opposite ends of said tubular member, said tubular member and end closures defining a chamber therebetween for housing the expansible material and at least one of said end closures being removable to enable material to be placed within and removed from the container, said second end closure comprising a closure element slidably received in said tubular member and which is adapted to engage the expansible material and retaining means for retaining said closure element within said tubular member, said retaining means including a compression spring having one end in abutting engagement with said closure element for biasing said closure element toward said first end closure and which is compressible to enlarge said chamber when the material therein undergoes an expansion, a member slidably received within the tubular member and abutting the other end of said compression spring, and a retaining element carried by the tubular member and extending radially inwardly thereof to form an abutment against which the said slidably received member abuts.

2. A container for material which expands when being frozen comprising, a tubular member, first end closure means for enclosing one end of said tubular member, second end closure means for closing the other end of said tubular member, said tubular member and end closures defining a chamber therebetween for housing the expansible material, said second end closure means adapted to engage the material in the tubular member and comprising a closure element that is cup-shaped and has a peripheral side wall slidably received within the tubular member, and means for retaining said end closure element within the said end of said tubular member, said retaining means including a retainer member spaced from said closure element and slidably received in the tubular member, a compression spring interposed between the cup-shaped end closure element and the retainer member compressible to provide an enlargement of said chamber when the material expands upon being frozen and a retaining element carried by the tubular member which projects radially inwardly of the tubular member and forms an abutment against which the retainer member abuts.

3. A container, as defined in claim 2, wherein said retainer element is generally U-shaped and slidably received within a pair of diametral opposite slots within the tubular member.

4. A container for material which expands when being frozen comprising, a tubular member made of an elastic plastic material, first end closure means for closing one end of said tubular member, second end closure means for closing the other end of said tubular member, said tubular member and end closures defining a chamber therebetween for housing the expansible material, said second end closure means comprising a closure element slidably received within said tubular member and which is adapted to engage the material therein and means for retaining said end closure element within the other end of said tubular member, said retainer means including a yieldable means in engagement with said closure element and which is compressible to provide an enlargement of said chamber when the material expands upon being frozen.

5. A container, as defined in claim 4, wherein said closure element is cup shaped and has an annular side wall slidably received within the tubular member.

6. A container, as defined in claim 4, and wherein said tubular member has a radial wall thickness at the end in which the second end closure means is disposed which is greater than the radial wall thickness of the remaining portion of the tubular member.

7. A container for material which expands when being frozen comprising, a tubular member, first end closure means for closing one end of said tubular member, second end closure means for closing the other end of said tubular member, said tubular member and end closures defining a chamber therebetween for housing the expansible material, said first end closure comprising a first closure element slidably received in the tubular member and a retaining element carried by the tubular member which projects radially inwardly thereof to form an abutment against which the said first closure element abuts, said second end closure means comprising a second closure element slidably received within said tubular member and which is adapted to engage the material therein and means for retaining said second end closure element within the other end of said tubular member, said retaining means including a yieldable means in engagement with said second closure element and which is compressible to provide an enlargement of said chamber when the material expands upon being frozen.

8. A container for receiving a comestible material to be frozen in said container, which material expands upon freezing, said container comprising a tube made of an elastic plastic material, first and second removable members closing the tube, said first and second removable members located adjacent opposite ends of the tube, a third member extending across and slidably received within the tube between the said first and second members spaced from but adjacent to said first member slidable theretoward under yielding resistance and defining a chamber for the product between the third member and said second member and defining a second chamber between the third member and said adjacent first member for movement of the third member in response to product expansion, and an aperture in said second member for the escape of air from the product chamber between the second and third members, whereby distortion of the tube is minimized when a comestible material is frozen and expands within the container.

9. A container for receiving a comestible material to be frozen in said container, which material expands upon freezing, said container comprising a cylindrical tube made of an elastic plastic material and open at opposite ends, a closure member adjacent each opposite end of the tube, at least one said closure member being slidably received within one end of the tube and including a transverse surface for retaining the container contents within the tube, and means, comprising a plurality of peripherally spaced slots in the tube adjacent the said one end and extending transversely of the central axis of the tube positioned between the transverse surface of the slidably received closure member and the said one end of the tube, for limiting movement of said transverse surface toward said one end of the tube.

References Cited
UNITED STATES PATENTS

| | | |
|---|---|---|
| 1,138,562 | 5/1915 | Herboldt. |
| 2,022,706 | 12/1936 | Clark _____ 220—93 |
| 2,161,071 | 6/1939 | McGrath et al. _____ 206—46 |
| 2,857,947 | 10/1958 | Powers _____ 150—.5 |

RAPHAEL H. SCHWARTZ, *Primary Examiner.*